United States Patent Office 3,546,496
Patented Dec. 8, 1970

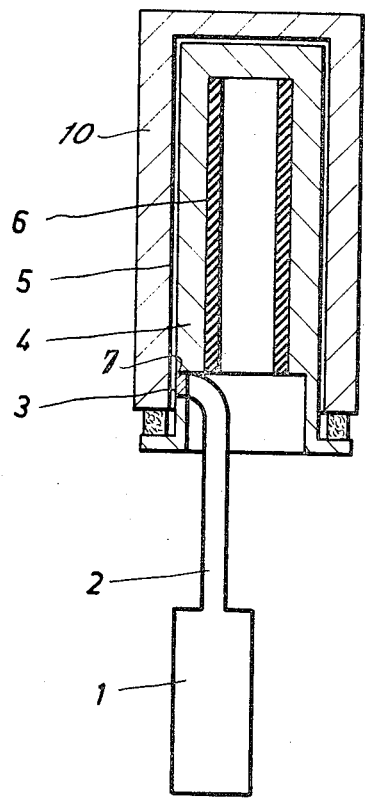

3,546,496
OVERHEATING PROTECTION DEVICE FOR THERMIONIC ELEMENTS HEATED BY NUCLEAR ENERGY
Franz Gross, Neckargemünd, and Rudolf Krapf, Leimen, Germany, assignors to Brown, Boveri & Cie A.G., Mannheim-Käfertal, Germany, a German corporation
Filed Dec. 4, 1967, Ser. No. 692,257
Claims priority, application Germany, Dec. 9, 1966, B 90,224
Int. Cl. H02n 3/00; H01j 45/00
U.S. Cl. 310—4                                5 Claims

ABSTRACT OF THE DISCLOSURE

An overheating protection device for thermionic converters which are heated by nuclear energy. A container 1 filled with a highly heat-conducting fluid, e.g. a gas having great thermal conductivity, such as helium, is connected with a discharge or electrode interspace 5 through a sealing means 3 of determined melting point and having thermal contact with the emitter. When the temperature of the thermionic element rises above the melting point of a fusible joint, such as of solder, this causes the fluid, e.g. helium contained within the container 1, to flow into the electrode interspace and to cause the excess heat of the emitter to flow into the collector.

---

Thermionic converters serve the purpose of directly converting heat energy into electrical energy. This invention relates to improvements in thermionic converter devices. For background information, reference is made to copending application entitled "Nuclear Reactor With Thermionic Converters," Serial No. 637,822, filed May 11, 1967, of Kurt Stahl, Reinhart Langpape and Ned S. Rasor; and also the co-pending application entitled "Thermionic Fuel Rod With Nuclear Fuel," Serial No. 657,820, of Franz Gross, Alfred Jester, Rudolf Krapf and Hubert Holick, filed Aug. 2, 1967; also Serial No. 670,187, filed Sept. 25, 1967, entitled "Thermionic Converter With Concentric Collector and Emitter" of Franz Gross and Rudolf Krapf, all assigned to the assignee of the present application.

In general, thermionic converters comprise two closely adjacent electrodes, one of which, in the form of an emitter, is intensely heated to the extent that electrons are emitted from one electrode (the emitter), the electrons then entering into the other electrode which constitutes the collector. The difference of the released energy of work can be recovered as electrical energy. The electrode interspace or chambers between the emitter and collector is filled, additionally, with a compensating medium such as caesium vapor, in order to prevent the development of a negative space charge between the emitter and collector.

It is a primary object of the present invention to provide overheating protection means for thermionic elements which are heated by nuclear energy, wherein the protection means are comprised of a discharge chamber formed by and between the collector and emitter. For further background information, reference is made to the German technical magazine "Atom Kernenergie," Volume number 9/10, 1965, page 365.

Nuclear energy may be used in a known manner as a source of heat for the thermionic converters of the present invention. Nuclear fuel and the transducers or thermionic converter units are assembled into the individual thermionic elements, and several of these elements are connected electrically in series and combined into a thermionic fuel rod. The cores of the nuclear reactors which serve for direct energy conversion are built-up with such fuel rods. The cooling system for the fuel rods usually comprises means for circulating a liquid metal, such as sodium, through the reactor core.

In the fuel rod of the example of the present application, the nuclear fuel is located inside of the emitter. A fission gas chamber may be provided for pumping off the fission gases which are created during the nuclear fission. Thus, the fuel, together with the moderator, the reflector and the regulating rod form the core of the nuclear reactor.

The output or capacity of the nuclear reactor is effected in a known manner by changing or controlling the flow of neutrons, by means of control rods which establish or adjust the respective temperature of the respective emitters of the thermionic converter.

In stationary or equilibrium condition, a balance exists between the heat which is supplied and the heat which is dissipated. The dissipated heat is composed of the following components;
(a) Heat radiation of a respective collector;
(b) Heat conduction across the electrical connections;
(c) The energy share derived from the electrons, which corresponds to the heat of evaporation of liquids; and
(d) Discharged electrical output or capacity.

The last two shares, (c) and (d), amount to about 60% of the heat dissipated.

If, during operation, the electrical load becomes eliminated for a particular thermionic element or an entire fuel rod, such as by interrupting the respective electrical circuit, then these shares (c) and (d) can no longer be drawn off, or dissipated and consequently the fuel rod heats up excessively. Since a melting condition must be avoided under all circumstances because it could bring about activation of the associated cooling cycle, which it would be most desirable to prevent, it has therefore been necessary under such conditions in the past to disconnect or shut down the nuclear reactor, even though the supply of electric power could be maintained with the remaining fuel rods.

It is therefore another object of the present invention to prevent, by appropriate measures, the overheating of nuclear fuel rods in thermionic converters during the occurrence of disturbances, so that the nuclear reactor may continue in operation in spite of such disturbances.

It is a further object of the present invention to provide maximum safety and economy of space and materials in a thermionic converter for converting heat energy directly into electrical energy.

To these ends, and in accordance with one feature of the invention, a container is filled with a fluid or gas having great thermal conductivity. This container is connected with a discharge chamber through a joint or sealing material which maintains continual thermal contact with the emitter of the thermionic converter.

A preferred embodiment of the invention is shown in the accompanying drawing, as a typical example, and will be described in greater detail below. In the drawing:

The single figure of the drawing is a longitudinal cross section of a thermionic converter embodying the principles of the present invention.

As shown in the drawing, a container 1, adapted to contain a fluid having a high thermal conductivity, such as helium gas, is connected by means of conduit 2 with the emitter 4 of the thermionic converted. The emitter 4 is adapted to be heated by nuclear fuel 6 in a known manner. An interspace 5 is defined by and between the emitter 4 and the collector 10. This interspace 5 is adapted to be filled with caesium vapor, and is sealed with a fusible metal joint 3, such as solder, which, as shown at 7, remains in thermal contact with the emitter 4 and also plugs the exit end of conduit 2 so that, until it melts, serves to seal off the communication between the conduit 2 and the interspace 5.

When the temperature of the subject thermionic unit rises above the predetermined selected melting point of the solder joint 3, the latter melts and the fluid, for example the helium gas, which is contained in container 1, flows through the conduit 2, out through the melted fusible metal joint 3 and into the electrode interspace 5. Due to the relatively high heat conductivity of the fluid from container 1, e.g. helium gas, now filling the interspace 5, the excess heat from the emitter 4 is supplied across the interspace to the collector 10, and is thus diverted from activating the cooling cycle (not shown) located on the outside of the fuel rod.

In the case of a single fuel rod, as illustrated, it is sufficient if this overheating protection device is applied to only one emitter 4 of the plurality of emitters in the entire fuel rod, since all electrode interspaces 5 of the fuel rod are interconnected with each other. Thus, the entire nuclear fuel rod is protected by the device in the one subject emitter 4, and when overheating threatens, excessive heat from the emitter 4 flows to collector 10, thus avoiding more serious damage.

In accordance with the present invention, over-heating of individual thermionic converters, or of entire fuel rods, is thus avoided in a simple manner, so that in spite of the elimination of a respective thermionic converter unit, the supply of electrical energy throughout the reactor is insured.

It will be obvious to those skilled in the art, upon studying this disclosure, that apparatus or devices according to the invention can be modified from that particularly shown and described herein without departing from the scope of the invention as set forth in the claims annexed hereto.

What is claimed is:

1. Overheating protection device for thermionic elements for converting heat energy into electrical energy, wherein the element is adapted to be heated by nuclear energy, comprising, in combination, emitter means, collector means, means forming an interspace between said emitter means and said collector means, container means adapted to be filled with a fluid of relatively high thermal conductivity, conduit means connecting said container with said interspace, and fusible sealing mass of predetermined melting point in thermal contact with said emitter means, whereby when the temperature of said emitter means exceeds said predetermined melting point said fusible material melts and said fluid is caused to flow from said container into said interspace to cause excessive heat in said emitter means to be transferred by a said fluid across said interspace to said collector means.

2. A device according to claim 1, said means forming said interspace being adapted to receive a compensating medium for compensating development of an excessive negative space charge in said interspace.

3. Device according to claim 2, wherein said compensating medium is caseium vapor.

4. A process for preventing overheating of a thermionic converter heated by nuclear energy comprising the steps of joining a source of fluid having a relatively high thermal conductivity with an interspace between the emitter and collector of a thermionic fuel element, placting a fusible sealing joint between said source and said interspace, said fusible joint having a melting point of predetermined value, so that upon overheating of said emitter to above said predetermined value, said fluid will flow from said course through the melting sealing joint and into said interspace and will cause excessive heat in said emitter to be transferred through said interspace to said collector.

5. A process in accordance with claim 4, said fluid having a high thermal conductivity being helium gas.

References Cited

UNITED STATES PATENTS 3,137,799    6/1964    O'Connor _____ 310—4

MILTON O. HIRSHFIELD, Primary Examiner

D. F. DUGGAN, Assistant Examiner